(12) United States Patent
Mansouri

(10) Patent No.: US 12,227,295 B2
(45) Date of Patent: Feb. 18, 2025

(54) UNITARY SEAT LEG FITTING FOR PASSENGER SEATS

(71) Applicant: Safran Seats USA LLC, Gainesville, TX (US)

(72) Inventor: Reza Mansouri, Santa Fe Springs, CA (US)

(73) Assignee: Safran Seats USA LLC, Gainesville, TX (US)

(*) Notice: Subject to any disclaimer, the term of this patent is extended or adjusted under 35 U.S.C. 154(b) by 168 days.

(21) Appl. No.: 17/872,807

(22) Filed: Jul. 25, 2022

(65) Prior Publication Data

US 2024/0025548 A1 Jan. 25, 2024

(51) Int. Cl.
*B64D 11/06* (2006.01)
*B60N 2/28* (2006.01)

(52) U.S. Cl.
CPC ........ *B64D 11/0648* (2014.12); *B60N 2/2824* (2013.01); *B64D 11/0696* (2013.01)

(58) Field of Classification Search
CPC .......... B64D 11/0648; B64D 11/0696
See application file for complete search history.

(56) References Cited

U.S. PATENT DOCUMENTS

| | | | | |
|---|---|---|---|---|
| 6,260,813 B1 * | 7/2001 | Whitcomb | ......... | B64D 11/0696 244/118.6 |
| 11,584,274 B1 * | 2/2023 | Mansouri | ................. | B60N 2/42 |
| 2003/0094838 A1 * | 5/2003 | Williamson | ........... | B60N 2/682 297/232 |
| 2010/0096502 A1 * | 4/2010 | VanderWolk | ...... | B64D 11/0696 248/503.1 |
| 2016/0251082 A1 * | 9/2016 | Shih | ....................... | F16B 41/002 248/636 |
| 2017/0021933 A1 * | 1/2017 | Pozzi | ................. | B64D 11/0648 |
| 2017/0113803 A1 * | 4/2017 | Maslakow | ......... | B64D 11/0648 |
| 2018/0029715 A1 * | 2/2018 | Larabie | ..................... | B64F 5/40 |
| 2019/0300178 A1 * | 10/2019 | Chadwell | ........... | B60N 2/01575 |
| 2020/0122841 A1 * | 4/2020 | Guillet | ............... | B64D 11/0696 |
| 2021/0387732 A1 * | 12/2021 | Salzer | ................. | B64D 11/0601 |
| 2022/0032821 A1 | 2/2022 | Parker et al. | | |
| 2022/0274507 A1 | 9/2022 | Gilbert | | |
| 2023/0312108 A1 * | 10/2023 | Selvarajan | ........... | B64D 11/064 244/118.6 |

FOREIGN PATENT DOCUMENTS

| | | | | |
|---|---|---|---|---|
| EP | 1892142 A1 * | 2/2008 | ......... | B60N 2/01575 |
| EP | 2403760 B1 * | 2/2016 | ......... | B60N 2/01566 |
| EP | 3222523 A1 * | 9/2017 | ......... | B64D 11/0639 |
| EP | 4316904 A1 * | 2/2024 | | |
| WO | WO-2008091233 A1 * | 7/2008 | ............. | B60N 2/015 |
| WO | WO-2012055508 A1 * | 5/2012 | ............. | B60N 2/919 |
| WO | WO-2012100152 A1 * | 7/2012 | ......... | B60N 2/01525 |
| WO | WO-2014115106 A1 * | 7/2014 | ........... | B60N 2/0232 |
| WO | WO-2014163580 A1 * | 10/2014 | ......... | B64D 11/0619 |
| WO | WO-2019074495 A1 * | 4/2019 | ............... | B60N 2/68 |
| WO | WO-2021148846 A1 * | 7/2021 | ............... | B60N 2/01 |

* cited by examiner

Primary Examiner — Timothy J Brindley
(74) Attorney, Agent, or Firm — Kilpatrick Townsend & Stockton LLP

(57) ABSTRACT

A seat leg assembly for a passenger seat, the seat leg assembly including: a seat leg member comprising a unitarily formed fitting member; and a plurality of stud members coupleable to the fitting member, wherein each of the plurality of stud members is formed of a material having an ultimate strength of at least 75 KSI.

20 Claims, 4 Drawing Sheets

UNITARY SEAT LEG FITTING FOR PASSENGER SEATS

FIELD OF THE INVENTION

The field of the invention relates to seat mounting assemblies for passenger vehicles such as aircraft.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot. Typically, a track fitting assembly is used to couple the passenger seat to the track via the passenger seat leg, where the track fitting assembly includes an aft fitting that has studs that extend outwardly from the track fitting body and connecting interface hardware for connecting the aft fitting to the seat leg. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Standard threaded fasteners or wedge-type elements are commonly used to create a snug fit between the studs and the track lips to prevent seat rattle and unintended seat displacement.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat leg assembly for a passenger seat, the seat leg assembly comprises: a seat leg member comprising a unitarily formed fitting member; and a plurality of stud members coupleable to the fitting member.

In some embodiments, each of the plurality of stud members comprises a threaded portion and each threaded portion is screwed into a respective opening in the fitting member.

In certain embodiments, each of the plurality of stud members is formed of a material having an ultimate strength of at least 75 KSI.

Each of the plurality of stud members may be formed of a different material than the seat leg member and the fitting member.

Each of the plurality of stud members, in some embodiments, is formed of steel or titanium and the seat leg member and the fitting member are each formed of aluminum, titanium, magnesium, steel, or alloy composites.

At least one of the plurality of stud members, in certain embodiments, is formed of a different material than the remaining stud members.

At least one of the plurality of stud members may be formed of steel or titanium and at least one other of the plurality of stud members is formed of aluminum, magnesium, or alloy composites.

According to certain embodiments, a passenger seat comprises a seat leg assembly comprising a seat leg member comprising a unitarily formed fitting member; and a plurality of stud members coupleable to the fitting member.

Each of the plurality of stud members may be formed of a material having an ultimate strength of at least 75 KSI.

In some embodiments, each of the plurality of stud members comprises a threaded portion and each threaded portion is screwed into a respective opening in the fitting member.

In certain embodiments, each of the plurality of stud members is formed of a material having an ultimate strength determined based on at least one of a location of the passenger seat within an aircraft, a type of the aircraft, or a configuration of the aircraft.

Each of the plurality of stud members may be formed of a different material than the seat leg member and the fitting member.

Each of the plurality of stud members, in some embodiments, is formed of steel or titanium and the seat leg member and the fitting member are each formed of aluminum, titanium, magnesium, steel, or alloy composites.

At least one of the plurality of stud members, in certain embodiments, is formed of steel or titanium and at least one other of the plurality of stud members is formed of aluminum, magnesium, or alloy composites.

At least one of the plurality of stud members may be formed of a different material than the remaining stud members.

According to certain embodiments, a seat leg assembly for a passenger seat comprises: a seat leg member comprising a unitarily formed fitting member; and a plurality of stud members unitarily formed with the fitting member.

In some embodiments, the seat leg member and the fitting member are unitarily formed without the use of a connecting member.

In certain embodiments, each of the plurality of stud members is formed of a material having an ultimate strength of at least 75 KSI.

Each of the plurality of stud members may be formed of a different material than the seat leg member and the fitting member.

Each of the plurality of stud members, the fitting member, and the seat leg member, in some embodiments, is formed of steel or titanium.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a seat leg fitting assembly for passenger seats. While the seat leg fitting assemblies are discussed for use with aircraft seats, they are by no means so limited. Rather, embodiments of the seat leg fitting assembly may be used in passenger seats or other seats of any type or otherwise as desired. For example, embodiments may be used on trains, buses, ships, automobiles, movie theaters, student seating, or any other instance when lightweight, securely anchored seats may be useful.

Figure 1:
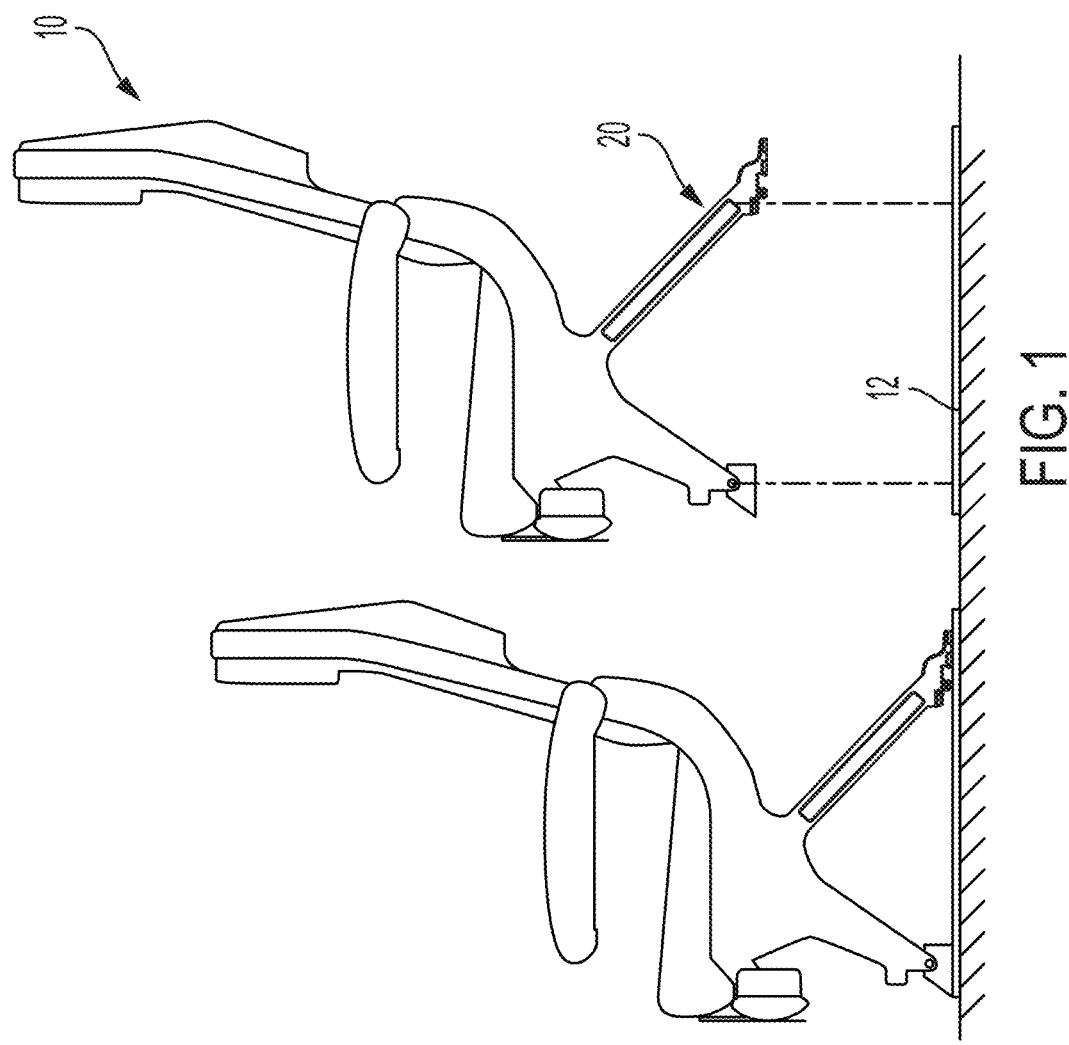
FIG. 1 is a side view of passenger seats secured to a track using a seat leg fitting assembly, according to certain embodiments of the present invention.

According to certain embodiments of the present invention, as shown in FIGS. 1-4, a seat leg fitting assembly may include a seat leg member, a fitting member, and a plurality of stud members. As shown in FIG. 1, the seat leg fitting assembly 20 may be configured to secure a passenger seat 10 to a track 12, as is discussed in more detail with respect to FIG. 4. The seat leg fitting assembly 20 may be formed of materials including but not limited to aluminum, stainless steel, titanium, magnesium, composite alloys, chopped fiber composites, aramid fibers, polycarbonate, polypropylene, other metallic materials, composite materials, or other similar materials that are able to provide the necessary structural integrity for securing the seat leg fitting assembly 20 to the track 12. Additionally, each feature of the seat leg fitting assembly 20 may be formed of the same materials or of different materials.

Figure 2:
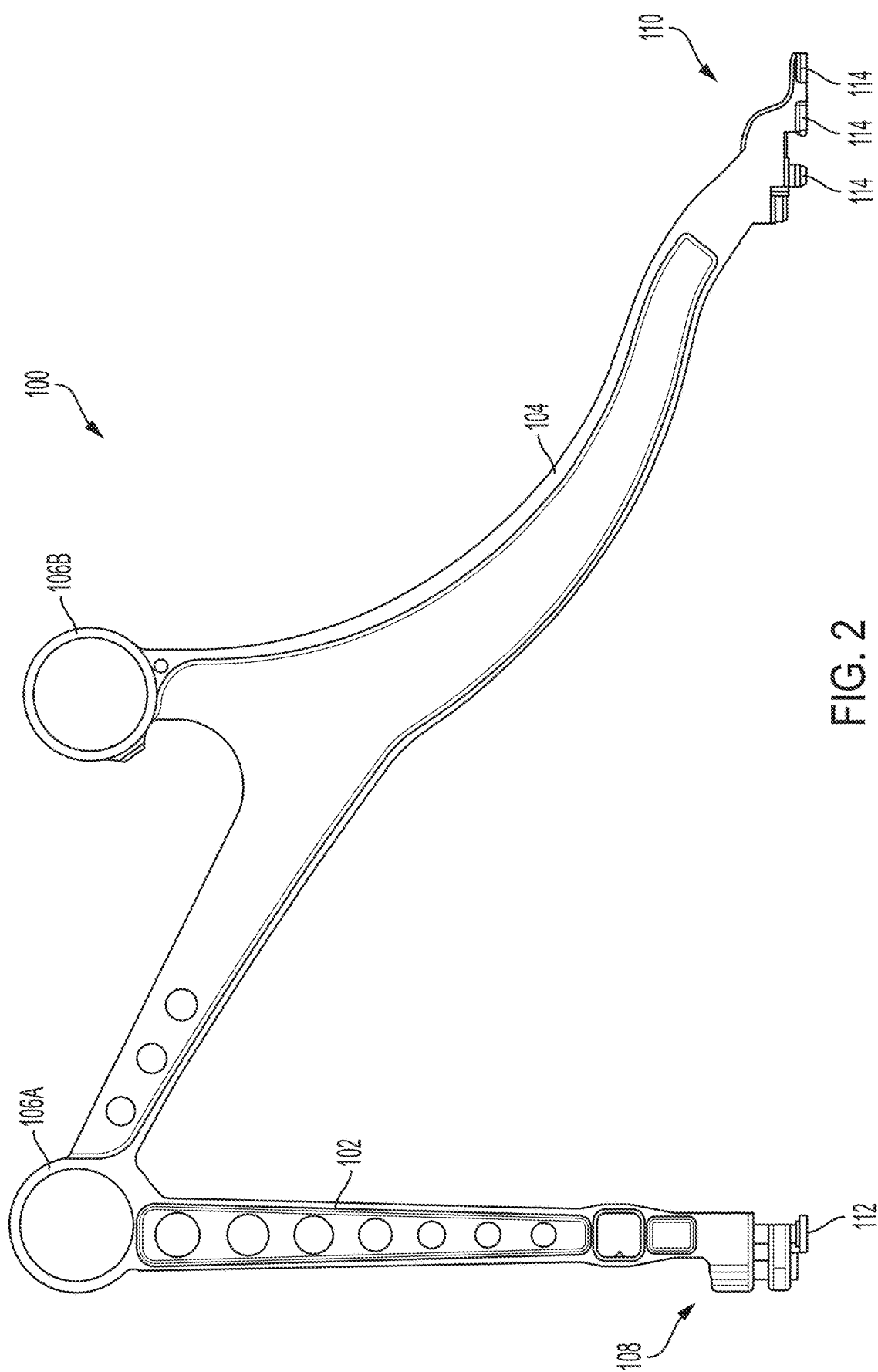
FIG. 2 is a side view of the seat leg fitting assembly of FIG. 1.

Referring to FIG. 2, a seat leg fitting assembly 100 for the passenger seat is generally illustrated. The seat leg fitting assembly 100 may be the same or similar to, and include the same or similar features as, the seat leg fitting assembly 20 discussed with respect to FIG. 1. The seat leg fitting assembly 100 may have various designs and configurations depending on particular use, but it generally includes a forward leg member 102 and an aft leg member 104. Optionally, the seat leg fitting assembly 100 includes connection locations 106A-B (e.g., base frame tube supports) for connecting to various components of the passenger seat (e.g., base frame tubes, other support structures, etc.).

The seat leg fitting assembly 100 includes a forward fitting member 108 at the forward leg member 102 and an aft fitting member 110 at the aft leg member 104. The forward fitting member 108 includes at least one forward stud 112 and the aft fitting member 110 includes at least one aft stud 114. In some examples, the forward fitting member 108 includes at least one and generally no more than two forward studs 112, although any number may be used in other examples. In various examples, the aft fitting member 110 includes usually two and generally no more than three aft studs 114, although any number may be used in other examples. The studs 112, 114 commonly have an inverted T-shape and are configured to engage with the seat track 12 (e.g., as seen in FIG. 1), although various other suitable shapes may be utilized for the studs 112, 114.

The aft fitting member 110 is integrally formed with the aft leg member 104 so that the aft fitting member 110 and the aft leg member 104 form a single, unitary piece. Integrally forming the aft fitting member 110 with the aft leg member 104 eliminates the need for any connecting interface hardware between the aft fitting member 110 and the aft leg member 104, which reduces the weight and production cost for the seat leg fitting assembly 100. For example, the aft fitting member 110 and the aft leg member 104 may be unitarily formed without the use of a connecting member. In some embodiments, the weight reduction of the integrally formed aft fitting member 110 and aft leg member 104 may be 30%-40%, 25%-45%, or 20%-50% compared to a separately formed aft fitting member and aft leg member that have been coupled together.

Figure 3:
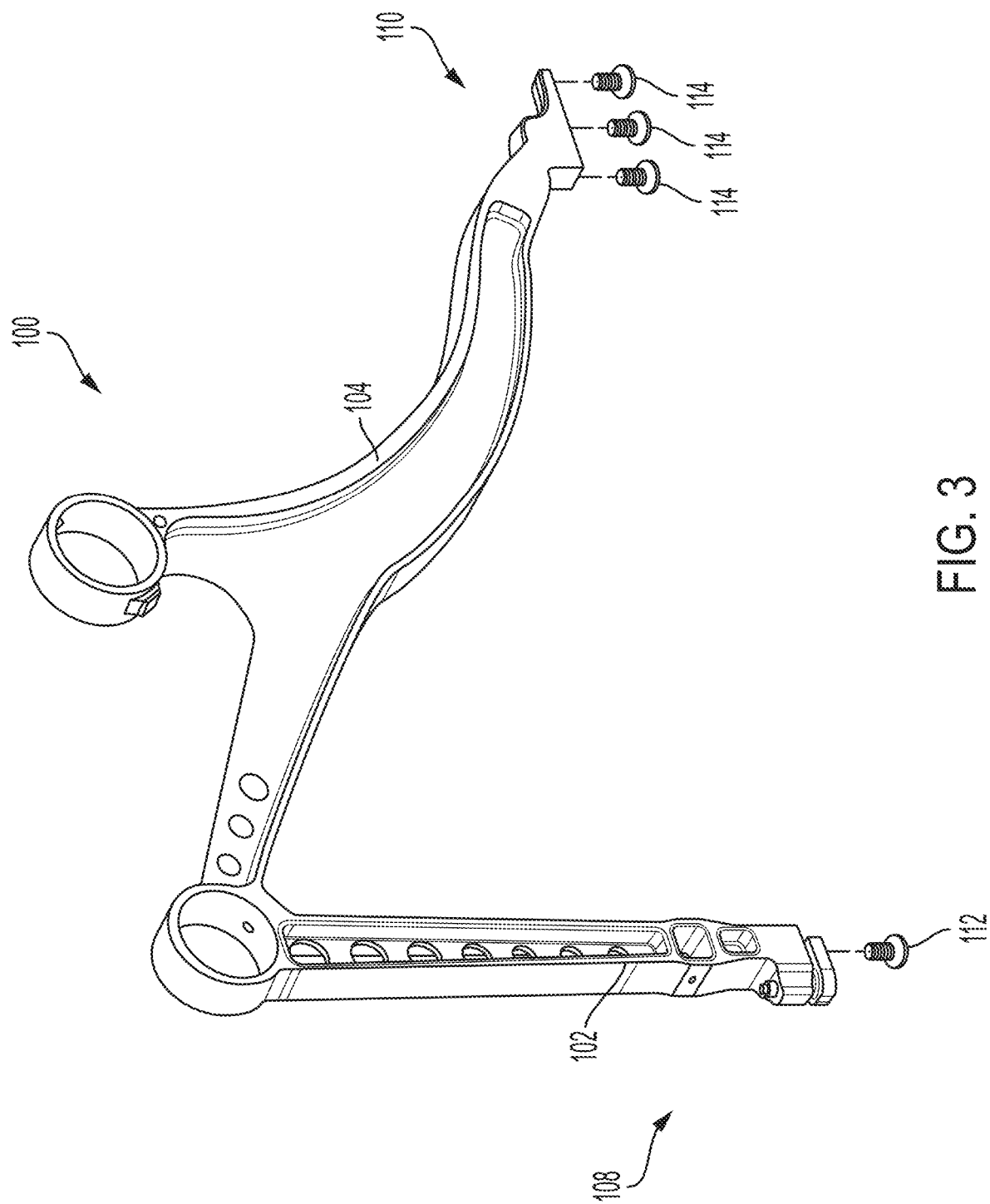
FIG. 3 is a perspective view of the seat leg fitting assembly of FIG. 1 with the studs shown in an exploded view.
Figure 4:
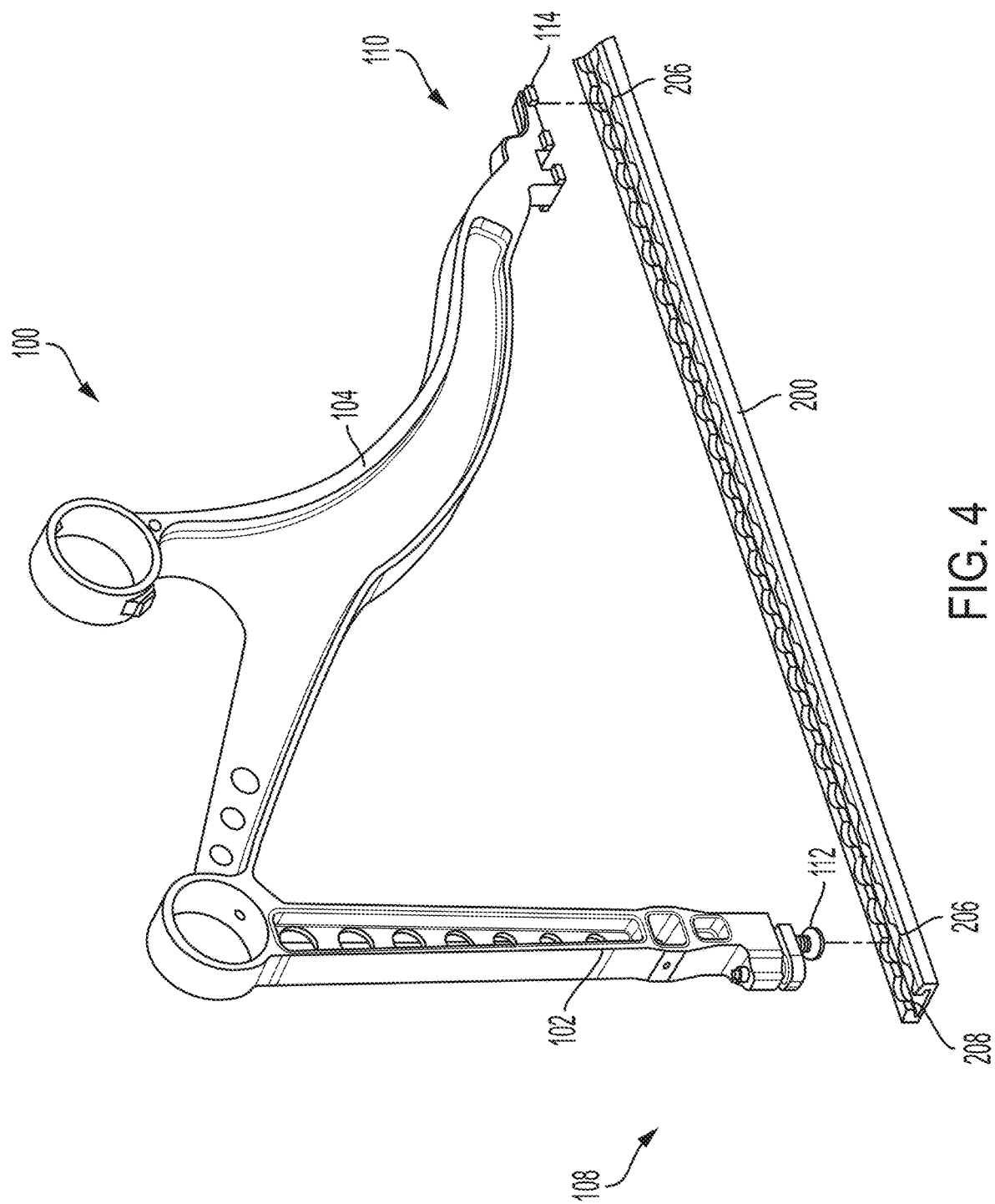
FIG. 4 is a perspective view of the a seat leg fitting assembly and a track, according to certain embodiments of the present invention.

The aft studs 114 may be integrally formed with the aft fitting member 110 (e.g., as seen in FIG. 4) so that the aft fitting member 110, the aft leg member 104, and the aft studs 114 form a single, unitary piece, or the aft studs 114 may be separately formed and coupled to the aft fitting member 110 that forms a single, unitary piece with the aft leg member 104 (e.g., as seen in FIG. 3). For example, each aft stud 114 may include a threaded neck that may be screwed into a corresponding opening in the aft fitting member 110 to couple the aft studs 114 to the aft fitting member.

Integrally forming the aft fitting member 110 with the aft leg member 104 and/or the aft fitting member 110, the aft leg member 104, and the aft studs 114 may allow for better design optimization decisions when it comes to forming the seat leg fitting assembly 100. For example, the ultimate strength requirements of the aft studs 114 may differ from those of the aft fitting member 110 and the aft leg member 104, so the aft studs 114 may be formed of a different material than the aft fitting member 110 and the aft leg member 104.

In some embodiments, the aft studs 114 must be formed from a material, e.g., steel or titanium, having an ultimate strength of at least 75 KSI. In further embodiments, the aft studs 114 may be formed from a material having an ultimate strength of at least 100 KSI, at least 125 KSI, at least 150 KSI, at least 175 KSI, at least 200 KSI, a range of 75-100 KSI, a range of 75-125 KSI, a range of 75-150 KSI, a range of 75-175 KSI, a range of 75-200 KSI, a range of 100-125 KSI, a range of 100-150 KSI, a range of 100-175 KSI, a range of 100-200 KSI, a range of 125-150 KSI, a range of 125-175 KSI, a range of 125-200 KSI, a range of 150-175 KSI, a range of 150-200 KSI, or a range of 175-200 KSI.

In certain embodiments, the aft fitting member 110 and the aft leg member 104 may be formed from steel, titanium, aluminum, magnesium, alloy composites, or any other suitable material having an ultimate strength of at least 30 KSI. In further embodiments, the aft studs 114 may be formed from a material having an ultimate strength of at least 50 KSI, at least 75 KSI, at least 100 KSI, at least 125 KSI, at least 150 KSI, a range of 30-50 KSI, a range of 30-75 75 KSI, a range of 30-100 KSI, a range of 30-125 KSI, a range of 30-150 KSI, a range of 50-75 KSI, a range of 50-100 KSI, a range of 50-125 KSI, a range of 50-150 KSI, a range of 75-100 KSI, a range of 75-125 KSI, a range of 75-150 KSI, a range of 100-125 KSI, a range of 100-150 KSI, or a range of 125-150 KSI.

For example, the aft studs 114 may be formed from steel or titanium having an ultimate strength of at least 75 KSI, and the aft fitting member 110 and the aft leg member 104 may both be formed from aluminum to reduce the overall weight of the seat leg fitting assembly 100 while meeting the ultimate strength requirements of the aft studs 114. In further examples, the aft fitting member 110 and the aft leg member 104 may both be formed from titanium, magnesium, steel, or alloy composites.

Additionally, the material and ultimate strength requirements of each of the aft studs 114 may be determined based on the location of the passenger seat 10 within the aircraft as well as the aircraft type and/or configuration due to the varying loads applied to the aft studs 114. Therefore, in some instances, the aft studs 114 may be formed from steel, titanium, aluminum, magnesium, alloy composites, or any other suitable material having an ultimate strength of at least 30 KSI, at least 50 KSI, at least 75 KSI, at least 100 KSI, at least 125 KSI, at least 150 KSI, a range of 30-50 KSI, a range of 30-75 KSI, a range of 30-100 KSI, a range of 30-125 KSI, a range of 30-150 KSI, a range of 50-75 KSI, a range of 50-100 KSI, a range of 50-125 KSI, a range of 50-150 KSI, a range of 75-100 KSI, a range of 75-125 KSI, a range of 75-150 KSI, a range of 100-125 KSI, a range of 100-150 KSI, or a range of 125-150 KSI. Further each of the aft studs 114 coupled to the aft fitting member 110 may be made of a different material and/or have a different ultimate strength than one or more of the other aft studs 114 coupled to the aft fitting member 110.

In certain embodiments, the aft fitting member 110 and the integrally formed aft leg member 104 may be formed from steel or titanium having an ultimate strength of at least 75 KSI. Thus, the aft studs 114 may also be integrally formed with the aft fitting member 110 to form a single piece. Due to the lack of a need for interfacing hardware to connect the aft fitting member 110, the aft leg member 104, and the aft studs 114, forming the aft fitting member 110, the aft leg member 104, and the aft studs 114 from steel or titanium may still result in an overall weight reduction of the seat leg fitting assembly 100. In such embodiments, the aft studs 114 may be formed of a different material than the aft fitting member 110 and the integrally formed aft leg member 104. Further, depending on the location of the passenger seat 10 within the aircraft, the aircraft type, and/or configuration, the aft fitting member 110, the integrally formed aft leg member 104, and the integrally formed aft studs 114 may be formed from a material having an ultimate strength of at least 30 KSI.

With respect to FIG. 4, the forward stud 112 is aligned with one of the track openings 206 of the track 200, and the leg assembly is vertically positioned such that the forward stud 112 is within the track channel 208. Additionally, the aft studs 114 are aligned with corresponding track openings 206 of the track 200, and the leg assembly is vertically positioned such that the aft studs 114 are within the track channel 208. The studs 112, 114 are then moved horizontally within the track channel 208 by moving the leg assembly horizontally so that the studs 112, 114 are misaligned with the corresponding track openings 206.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1 is a seat leg assembly (which may incorporate features of any of the subsequent examples) for a passenger seat, the seat leg assembly comprising: a seat leg member comprising a unitarily formed fitting member; and a plurality of stud members coupleable to the fitting member.

Example 2 is the seat leg assembly of example(s) 1 or any of the preceding or subsequent examples, wherein each of the plurality of stud members comprises a threaded portion and each threaded portion is screwed into a respective opening in the fitting member.

Example 3 is the seat leg assembly of example(s) 1 or any of the preceding or subsequent examples, wherein each of the plurality of stud members is formed of a material having an ultimate strength of at least 75 KSI.

Example 4 is the seat leg assembly of example(s) 1 or any of the preceding or subsequent examples, wherein each of the plurality of stud members is formed of a different material than the seat leg member and the fitting member.

Example 5 is the seat leg assembly of example(s) 1 or any of the preceding or subsequent examples, wherein each of the plurality of stud members is formed of steel or titanium and the seat leg member and the fitting member are each formed of aluminum, titanium, magnesium, steel, or alloy composites.

Example 6 is the seat leg assembly of example(s) 1 or any of the preceding or subsequent examples, wherein at least one of the plurality of stud members is formed of a different material than the remaining stud members.

Example 7 is the seat leg assembly of example(s) 6 or any of the preceding or subsequent examples, wherein at least one of the plurality of stud members is formed of steel or titanium and at least one other of the plurality of stud members is formed of aluminum, magnesium, or alloy composites.

Example 8 is a passenger seat (which may incorporate features of any of the preceding or subsequent examples) comprising a seat leg assembly comprising: a seat leg member comprising a unitarily formed fitting member; and a plurality of stud members coupleable to the fitting member.

Example 9 is the passenger seat of example(s) 8 or any of the preceding or subsequent examples, wherein each of the plurality of stud members is formed of a material having an ultimate strength of at least 75 KSI.

Example 10 is the passenger seat of example(s) 8 or any of the preceding or subsequent examples, wherein each of the plurality of stud members comprises a threaded portion and each threaded portion is screwed into a respective opening in the fitting member.

Example 11 is the passenger seat of example(s) 8 or any of the preceding or subsequent examples, wherein each of the plurality of stud members is formed of a material having an ultimate strength determined based on at least one of a location of the passenger seat within an aircraft, a type of the aircraft, or a configuration of the aircraft.

Example 12 is the passenger seat of example(s) 8 or any of the preceding or subsequent examples, wherein each of the plurality of stud members is formed of a different material than the seat leg member and the fitting member.

Example 13 is the passenger seat of example(s) 8 or any of the preceding or subsequent examples, wherein each of the plurality of stud members is formed of steel or titanium and the seat leg member and the fitting member are each formed of aluminum, titanium, magnesium, steel, or alloy composites.

Example 14 is the passenger seat of example(s) 8 or any of the preceding or subsequent examples, wherein at least one of the plurality of stud members is formed of steel or titanium and at least one other of the plurality of stud members is formed of aluminum, magnesium, or alloy composites.

Example 15 is the passenger seat of example(s) 14 or any of the preceding or subsequent examples, wherein at least one of the plurality of stud members is formed of a different material than the remaining stud members.

Example 16 is a seat leg assembly (which may incorporate features of any of the preceding or subsequent examples) for a passenger seat, the seat leg assembly comprising: a seat leg member comprising a unitarily formed fitting member; and a plurality of stud members unitarily formed with the fitting member.

Example 17 is the seat leg assembly of example(s) 16 or any of the preceding or subsequent examples, wherein the seat leg member and the fitting member are unitarily formed without the use of a connecting member.

Example 18 is the seat leg assembly of example(s) 16 or any of the preceding or subsequent examples, wherein each of the plurality of stud members is formed of a material having an ultimate strength of at least 75 KSI.

Example 19 is the seat leg assembly of example(s) 16 or any of the preceding or subsequent examples, wherein each of the plurality of stud members is formed of a different material than the seat leg member and the fitting member.

Example 20 is the seat leg assembly of example(s) 16 or any of the preceding examples, wherein each of the plurality of stud members, the fitting member, and the seat leg member is formed of steel or titanium.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat leg assembly for a passenger seat, the seat leg assembly comprising:
    a first seat leg member comprising an integrally formed first fitting member;
    at least one first stud member coupleable to the first fitting member; and
    a second seat leg member comprising an integrally formed second fitting member and a plurality of second stud members integrally formed with the second fitting member;
    wherein the second fitting member comprises a first side wall, a second side wall, and a lower surface extending between the first side wall and the second side wall; and
    wherein at least one of the plurality of second stud members comprises a first portion extending from the first side wall of the second fitting member and a second portion extending from the second side wall of the second fitting member.

2. The seat leg assembly of claim 1, wherein the at least one first stud member comprises a threaded portion and the threaded portion is screwed into an opening in the first fitting member.

3. The seat leg assembly of claim 1, wherein each of the at least one first stud member and the plurality of second stud members is formed of a material having an ultimate strength of at least 75 KSI.

4. The seat leg assembly of claim 1, wherein the at least one first stud member is formed of a different material than the first seat leg member and the first fitting member.

5. The seat leg assembly of claim 1, wherein a lower surface of the first portion of the at least one of the plurality of second stud members and a lower surface of the second portion of the at least one of the plurality of second stud members are co-planar with the lower surface of the second fitting member.

6. The seat leg assembly of claim 1, wherein the first seat leg member is positioned forward of the second seat leg member.

7. The seat leg assembly of claim 1, wherein the first portion and the second portion of the at least one of the plurality of second stud members extend out horizontally from the respective first side wall of the second fitting member and the second side wall of the second fitting member.

8. A passenger seat comprising a seat leg assembly comprising:
    a first seat leg member comprising an integrally formed first fitting member;
    at least one first stud member coupleable to the first fitting member; and
    a second seat leg member comprising an integrally formed second fitting member and a plurality of second stud members integrally formed with the second fitting member;
    wherein the second fitting member comprises a first side wall, a second side wall, and a lower surface extending between the first side wall and the second side wall; and
    wherein at least one of the plurality of second stud members comprises a first portion extending from the first side wall of the second fitting member and a second portion extending from the second side wall of the second fitting member.

9. The passenger seat of claim 8, wherein each of the at least one first stud member and the plurality of second stud members is formed of a material having an ultimate strength of at least 75 KSI.

10. The passenger seat of claim 8, wherein the at least one first stud member comprises a threaded portion and the threaded portion is screwed into an opening in the first fitting member.

11. The passenger seat of claim 8, wherein each of the at least one first stud member and the plurality of second stud members is formed of a material having an ultimate strength determined based on at least one of a location of the passenger seat within an aircraft, a type of the aircraft, or a configuration of the aircraft.

12. The passenger seat of claim 8, wherein the at least one first stud member is formed of a different material than the first seat leg member and the first fitting member.

13. The passenger seat of claim 8, wherein a lower surface of the first portion of the at least one of the plurality of second stud members and a lower surface of the second portion of the at least one of the plurality of second stud members are co-planar with the lower surface of the second fitting member.

14. The passenger seat of claim 8, wherein the first seat leg member is positioned forward of the second seat leg member.

15. The passenger seat of claim 8, wherein the first portion and the second portion of the at least one of the plurality of second stud members extend out horizontally from the respective first side wall of the second fitting member and the second side wall of the second fitting member.

16. A seat leg assembly for a passenger seat, the seat leg assembly comprising:
- a seat leg member comprising an integrally formed fitting member; and
- a plurality of stud members integrally formed with the fitting member;
- wherein the fitting member comprises a first side wall, a second side wall, and a lower surface extending between the first side wall and the second side wall; and
- wherein at least one of the plurality of stud members comprises a first portion extending from the first side wall of the fitting member and a second portion extending from the second side wall of the fitting member.

17. The seat leg assembly of claim 16, wherein the seat leg member and the fitting member are integrally formed without the use of a connecting member.

18. The seat leg assembly of claim 16, wherein each of the plurality of stud members is formed of a material having an ultimate strength of at least 75 KSI.

19. The seat leg assembly of claim 16, wherein the first portion and the second portion of the at least one of the plurality of stud members extends out horizontally from the respective first side wall of the second fitting member and the second side wall of the second fitting member.

20. The seat leg assembly of claim 16, wherein a lower surface of the first portion of the at least one of the plurality of stud members and a lower surface of the second portion of the at least one of the plurality of stud members are co-planar with the lower surface of the fitting member.

\* \* \* \* \*